United States Patent [19]

Rosenwaks et al.

[11] Patent Number: 4,553,243

[45] Date of Patent: Nov. 12, 1985

[54] CHEMICAL LASER

[76] Inventors: Salman Rosenwaks, 20/3 Sinai St., Beer-Sheva; David Chuchem, 11 Hakerem St., Omer, both of Israel

[21] Appl. No.: 420,624

[22] Filed: Sep. 21, 1982

[30] Foreign Application Priority Data

Jan. 28, 1982 [IL] Israel ................................ 64884

[51] Int. Cl.$^4$ ............................................. H01S 3/095
[52] U.S. Cl. ..................................... 372/89; 372/701; 372/58
[58] Field of Search ..................... 372/701, 89, 90, 87, 372/55, 58

[56] References Cited

U.S. PATENT DOCUMENTS

| | | | |
|---|---|---|---|
| 3,560,876 | 2/1971 | Airey | 372/89 |
| 3,688,215 | 8/1972 | Spencer et al. | 372/89 |
| 3,701,045 | 10/1972 | Bronfin et al. | 372/89 |
| 3,706,942 | 12/1972 | Ultree | 372/89 |
| 3,803,512 | 4/1974 | Pettipiece | 372/89 |
| 3,886,477 | 5/1975 | Ruby et al. | 372/90 |
| 3,918,800 | 11/1975 | Griffin | 372/90 |
| 3,982,208 | 9/1976 | Camac | 372/89 |
| 4,031,484 | 6/1977 | Freiberg et al. | 372/89 |
| 4,188,592 | 1/1980 | Buczek et al. | 372/89 |
| 4,206,429 | 6/1980 | Pinsley | 378/90 |
| 4,453,914 | 6/1984 | Huncei et al. | 378/89 |

OTHER PUBLICATIONS

Seguin et al; "Low Voltage Gas Transport TECO$_2$ Laser", Appl. Opt., vol. 11, No. 4, pp. 745–748, Apr. 1972.

Rosenwaks et al; "A Supersonic Multikilohertz Pulsed HF Chemical Laser", J. Appl. Phys., 54(1), Jan. 1983, p. 48.

Dudkin et al; "Gasdynamic CO Chemical Laser Using Air and Carbon Disulfide"; Soc. Tech. Phys. Lett., 6(3), Mar. 1980.

*Primary Examiner*—William L. Sikes
*Assistant Examiner*—Léon Scott, Jr.
*Attorney, Agent, or Firm*—Toren, McGeady, Stanger, Goldberg & Kiel

[57] ABSTRACT

There is provided a high repetition rate chemical laser comprising in combination a mixing chamber, an inlet for continuously introducing reactants into the chamber, a supersonic nozzle constituting an exit from the mixing chamber, a laser cavity located at the exit of the nozzle and a device for applying pulsed electrical discharge to the reactants in the laser cavity and a method of continuous lasing at a high repetition rate which includes premixing the desired reactants, if required with diluents or inhibitors, expanding the resulting gaseous mixture through a supersonic nozzle to a velocity greater than the combustion velocity of the mixture, and applying to the mixture a high-rate pulsed electrical discharge for initiating the chemical reaction and convecting the spent gases from the laser cavity.

16 Claims, 2 Drawing Figures

FIG. I

CHEMICAL LASER

FIELD OF THE INVENTION

The invention relates to novel high-repetition rate chemical lasers. The lasers are operated by premixing reactants on the fly which are then expanded through a supersonic nozzle, downstream of which there is located a laser cavity provided with means for applying a pulsed electrical discharge to said reactants mixture, initiating the required chemical reaction producing the excited species resulting in the desired laser emission. The novel laser can be effectively operated at pulse rates of tens of kilohertz. The novel laser can be used for isotope separation.

BACKGROUND OF THE INVENTION

Various types of chemical lasers are known. These comprise two main types:

a. The first type is based on in situ mixing of an oxidizer and a fuel gas, producing a continiuous output. The gas mixture can be activated by means of electrical discharge (microwave, RF or DC), or by thermal decomposition (archeaters or combustors), to produce reaction-initiating species. The rate of the chemical reaction is diffusion dominated and thus this type of laser must be operated at comparatively low pressures (of the order of 1–20 Torr), so that the rate of production of lasing species will exceed the rate of their collisional deactivation.

b. The second type is based on the use of premixed fuels and oxidizers, where the necessary reaction-initiating species are produced by flash photolysis, by an electron beam, or by a pulsed discharge. Such premixed reactants may present flameout and detonation problems. Once the mixture is ignited, it is difficult to extinguish it, and the combustion is apt to transform via a chain reaction into a detonation wave which can cause damage to the device.

Two main types of molecules are operated as lasing species in chemical lasers: hydrogen halide (HX) and carbon monoxide (CO). For HX lasers suitable fuels are hydrogen (or deuterium) containing molecules such as hydrogen, hydrocarbons, and various organic and inorganic hydrides; suitable oxidizers are halogen containing molecules such as fluorine, nitrogen tri-fluoride, sulfur hexafluoride, chlorine, bromine, and various organic and inorganic halides. In order to inhibit prereaction in fuel-oxidizer mixtures suitable radical scavengers such as oxygen and nitrous oxide can be used. For CO lasers suitable fuels are carbon containing molecules such as carbon disulphide and carbon diselenide; suitable oxidizers are oxygen containing molecules such as oxygen, ozone, nitrous oxide, and sulfur dioxide. The active reactants are often diluted with a suitable inert gas such as helium, arson, and nitrogen. Detailed lists of fuel, oxidizers, and diluents for chemical lasers are given in "Handbook of Chemical Lasers", edited by R. W. F. Gross and J. F. Bott (Wiley, N.Y., 1976), and these are suitable for use in a system of the type disclosed herein.

SUMMARY OF THE INVENTION

The invention relates to a high-repetition-rate pulsed chemical laser. The laser comprises in combination: a mixing chamber for premixing reactants, which are continously fed through the device, entry means into said chamber, a supersonic nozzle leading from said chamber to a laser cavity, which laser cavity is provided with means for applying a pulsed electrical discharge to said reactants, thereby initiating the chemical reaction which produces the excited species and the laser emission. The process of lasing according to the invention comprises premixing reactants and diluent gases, if desired with an inhibitor, expanding the resulting gaseous mixture continously through a supersonic nozzle to a velocity greater than the combustion velocity and applying a pulsed electrical discharge initiating the chemical reaction resulting in the production of the lasing species. The spent gases are convected out of the cavity while new unreacted gaseous reactants are introduced into the laser cavity at supersonic speed. Since the reacting gases are blown out of the laser cavity at a velocity greater than that at which the reaction can propagate upstream, there is no hindrance to the replenishment of the laser cavity with unreacted gas before the initiation of the next pulse cycle. The frequency of pulses can be adjusted to the intended uses. It is generally in the kilohertz range, and pulse rates of the order of tens of kilohertz can be attained. The electrical pulses are of the order of fraction of Joules to Joules, and these are applied at a frequency of from about 100 Hz to 100 kHz. The gases are introduced into the mixing chamber on the fly obtaining pressures of the order of from a few Torrs to multi-atmospheres, and from there it flows through a supersonic nozzle attaining a flow velocity from 1 to 10 Mach. The novel laser can be used in an isotope separation process of the type defined in DAS No. 2,312,194 of 12.3.1973, where up to three dye lasers are used at multi-kilohertz repetition rates to selectively excite one out of a number of isotopic species and to ionize such excited species by an infrared photon from a carbon dioxide laser.

EXAMPLES OF THE INVENTION

The invention is illustrated with reference to the enclosed schematical drawings, which are not necessarily according to scale, and in which.

Figure 1:
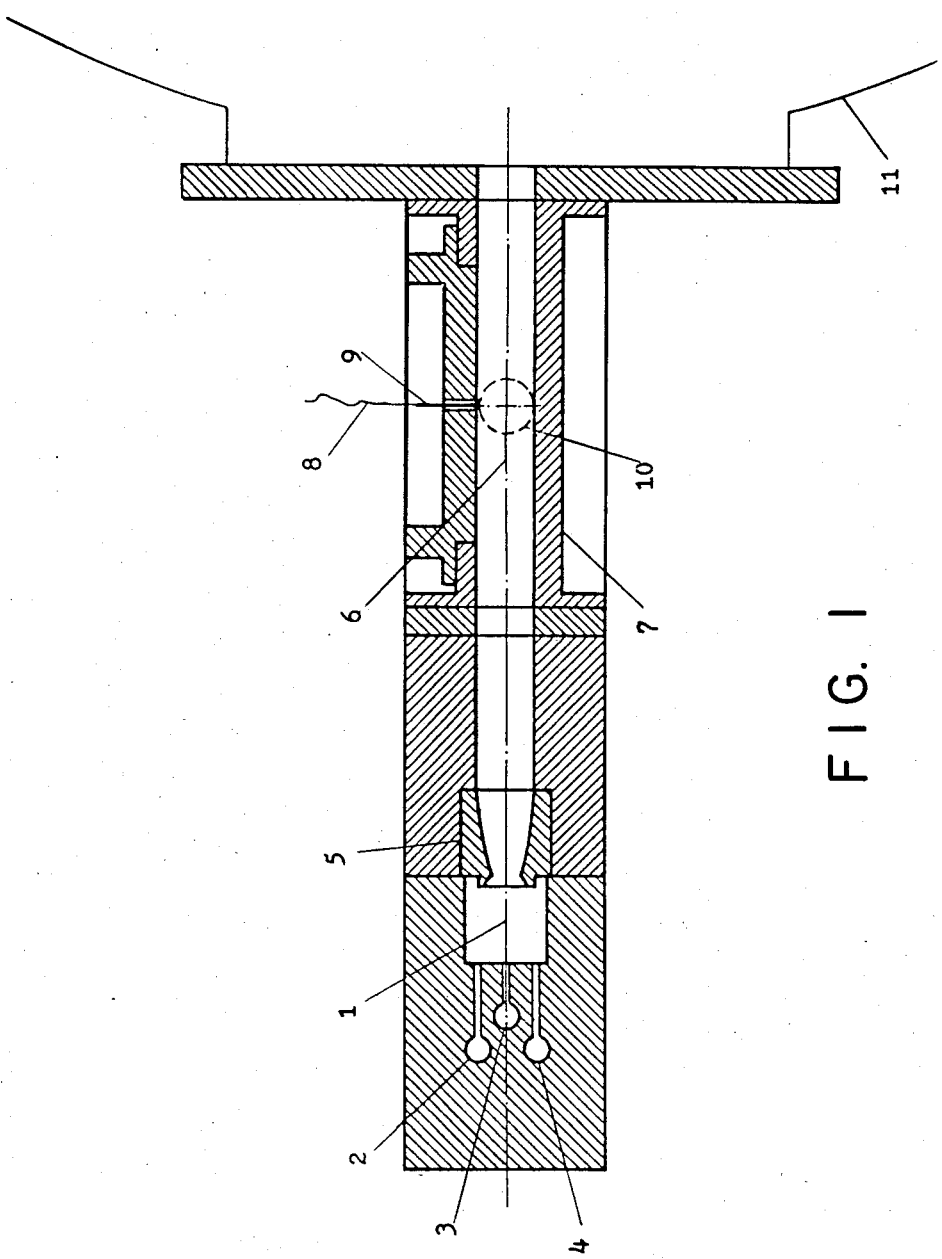
FIG. 1 is a sectional side-view through a laser according to the invention.
Figure 2:
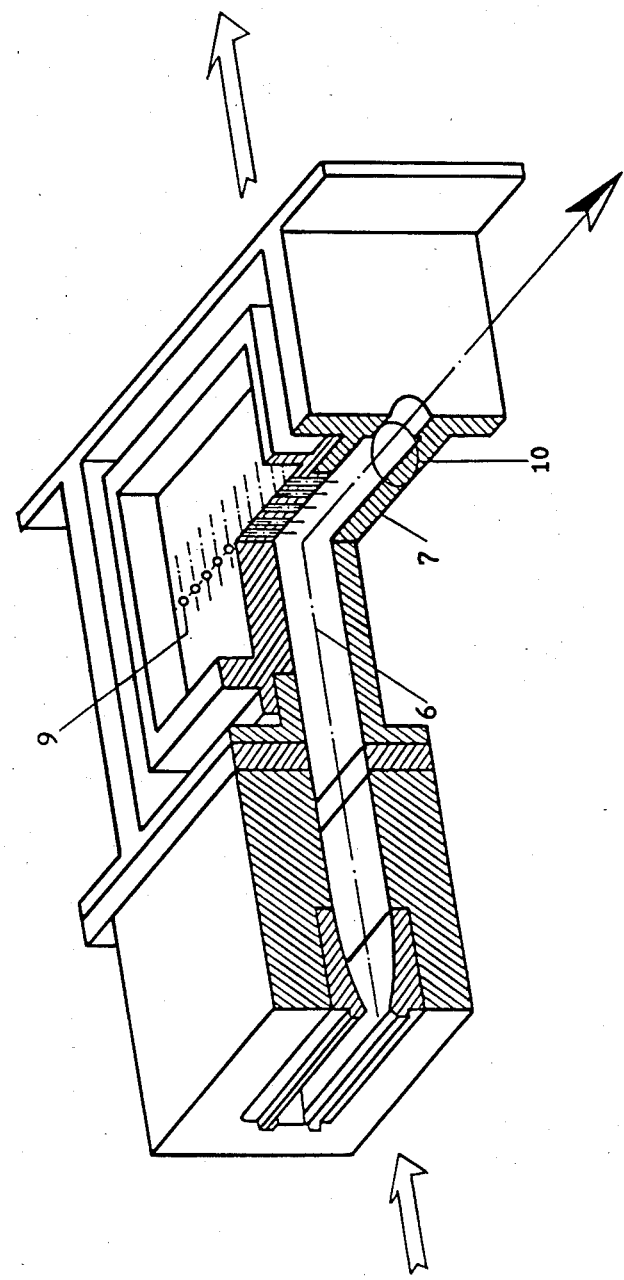
FIG. 2 is an isometric drawing of the same laser cut away for clarity.

As shown in FIG. 1, the novel laser according to the invention comprises in combination a mixing chamber 1, provided with inlet means 2, 3, and 4 for the gaseous species, which pass via supersonic nozzle 5 into the laser cavity 6, where means are provided for applying high-repetition-rate electrical pulses, comprising a metal anode 7, and a high voltage (H.V.) pulse connection 8, to metal pin cathodes 9, said metal anode being connected to a ground return, and said H.V. pulse connection being connected through appropriate ballast to a H.V. pulse forming network. 10 is an output coupling mirror facing same there is provided another mirror, not shown, at a distance from same on the opposite wall of the laser cavity, 11 is a vacuum dump tank connected to a vacuum pump. The numbering of the laser parts shown in FIG. 2 are the same as in FIG. 1.

To further elucidate the invention, a number of embodiments will be described as nonlimiting examples:

1. A device was built wherein the mixing chamber had a volume of 84 ml, and into said mixing chamber there were injected through appropriate jets of sulfur hexafluoride from a pressure of 2 atm, gaseous hydrogen from a pressure of 10 atm, and helium from a pressure of 10 atm. The resulting gaseous mixture in the mixing chamber was 8 vol-% sulfur hexafluoride, 4 vol-% hydrogen, and 88 vol-% helium at a stagnation pressure of 200 Torr in the mixing chamber. The gaseous mixture passed through a Mach 2.5 supersonic nozzle at a flow rate of 65 liters/second NTP into the discharge chamber. The throat height of the supersonic nozzle was 9 mm. The rectangular cross-section discharge chamber had a height of 2 cm and a length of 10 cm. The pressure in the discharge chamber was 12 Torr. There was applied a transverse electrical pulse of 2 Joules at a frequency of 6500 Hertz. The laser cavity was transverse to both the flow and discharge direction. The aperture was 20 mm. The distance between the mirrors was 100 mm. The full reflector was dielectric enhanced gold on glass. The partial reflector was dielectric coated zinc selenide having a 92% reflectivity around 2.8 microns. Both mirrors had a 1 m radius of curvature. There resulted laser pulses of about 1.5 milli Joules each in the HF band. Thus the average power of the laser was about 10 watts.

2. Using said device and said working conditions, except replacing sulfur hexafluoride by fluorine and adding 1% of oxygen to the gaseous mixture in the mixing chamber, increases the average power of the laser to more than 100 watts. The device can be operated at higher pressures, such as for example 1 to 10 atmospheres steady pressure in the mixing chamber, with similar ratios of reactants giving a correspondingly higher output, proportional to the mass flow. In this case no vacuum dump tank is required and the spent gases are vented to the atmosphere.

We claim:

1. A chemical laser operating in a quasi-continuous manner comprising a subsonic stagnation premixing chamber having an inlet and an outlet, means for continuously introducing reactants through the inlet into said chamber forming a gaseous mixture on the fly in said chamber, a supersonic nozzle located at the outlet from said chamber, said nozzle having an outlet, a laser cavity located at the outlet from said nozzle receiving the mixture of gaseous chemical reactant at a velocity exceeding the combustion velocity of said mixture, means for applying a pulsed electrical discharge to said reactants in said laser cavity, and means for exhausting the spent cases from said laser cavity to the atmosphere.

2. A device according to claim 1 comprising said introducing means for directing gaseous reactants into the mixing chamber.

3. A device according to claim 1, wherein the supersonic nozzle is of rectangular cross-section.

4. A device according to claim 1, wherein a pair of mirrors facing each other in spaced relation is provided in the laser cavity.

5. A device according to claim 1, wherein said laser cavity has an exit and a vacuum dump tank connected to the exit of the laser cavity.

6. A device according to claim 1, wherein said means for applying a pulsed electrical discharge provides a pulse at a kiloherz repetition-rate.

7. A method of operating a quasi-continuous chemical laser at a high repetition-rate comprising the steps of premixing gaseous reactants in a mixing chamber forming a gaseous mixture on the fly, expanding the resulting gaseous mixture in the chamber by passing the mixture out of the chamber through a supersonic nozzle flowing at a velocity greater than the combustion velocity of said mixture into a laser cavity, initiating the chemical reaction downstream of the nozzle in the laser cavity by applying a pulsed electrical discharge to said mixture at a high repetition rate, and convecting spent gases from the laser cavity.

8. A method according to claim 7, wherein a steady state pressure in the mixing chamber below is maintained atmospheric pressure and the spent gases are vented into an atmosphere maintained at a pressure below atmospheric pressure.

9. A method according to claim 7, wherein a steady state pressure in the mixing chamber is maintained at above atmospheric pressure and the spent gases are vented into the atmosphere.

10. A method according to claim 7, wherein the reactants consist of sulfur hexafluoride in combination with a member of the group consisting of hydrogen and hydrocarbon fuels, with an inert diluent.

11. A method according to claim 7, wherein the reactants consist of, in combination, fluorine, and a member selected from hydrogen and a hydrocarbon fuel, and a diluent.

12. A method according to claim 7, wherein the reactants consist of one of chlorine or bromine in combination with hydrogen.

13. A method according to claim 7, wherein the reactants consist of, in combination sulfur, hexafluoride and a member of the group consisting of alkanes, $AsH_3$ and $GeH_4$.

14. A method according to claim 7, wherein the reactants are carbon containing molecules selected from carbon disulfide and carbon diselenide, and an oxygen containing molecule selected from oxygen, ozone, nitrous oxide and sulfur dioxide.

15. A method according to claim 7, wherein a gas stagnation pressure is maintained in the chamber high enough to allow discharge into the atmosphere.

16. A method, according to claim 7, including mixing a diluent with the reactants in the mixing chamber.

* * * * *